(12) United States Patent
Liege et al.

(10) Patent No.: US 10,393,252 B2
(45) Date of Patent: Aug. 27, 2019

(54) PULLEY DEVICE FOR TENSIONER ROLLER OR WINDING ROLLER

(71) Applicants: Frederic Liege, Monts (FR); Torbjorn Hedman, Saint Cyr sur Loire (FR); Romuald Lescorail, Saint Cyr sur Loire (FR)

(72) Inventors: Frederic Liege, Monts (FR); Torbjorn Hedman, Saint Cyr sur Loire (FR); Romuald Lescorail, Saint Cyr sur Loire (FR)

(73) Assignee: Aktiebolaget SKF, Göteborg (SE)

( * ) Notice: Subject to any disclaimer, the term of this patent is extended or adjusted under 35 U.S.C. 154(b) by 168 days.

(21) Appl. No.: 15/228,510

(22) Filed: Aug. 4, 2016

(65) Prior Publication Data

US 2017/0037953 A1 Feb. 9, 2017

(30) Foreign Application Priority Data

Aug. 6, 2015 (FR) ...................... 15 57574

(51) Int. Cl.
| *F16H 55/36* | (2006.01) |
| *F16H 7/08* | (2006.01) |
| *F16H 7/20* | (2006.01) |
| *F16C 35/063* | (2006.01) |
| *F16C 35/073* | (2006.01) |
| *F16B 41/00* | (2006.01) |
| *F16C 13/00* | (2006.01) |

(52) U.S. Cl.
CPC ............ *F16H 55/36* (2013.01); *F16C 35/063* (2013.01); *F16C 35/073* (2013.01); *F16H 7/08* (2013.01); *F16H 7/20* (2013.01); *F16B 41/002* (2013.01); *F16C 13/006* (2013.01); *F16H 2007/0865* (2013.01)

(58) Field of Classification Search
CPC ... F16H 55/36; F16H 7/08; F16H 7/12; F16H 7/20; F16H 2007/0865; F16C 13/006; F16C 35/063; F16C 2007/0865; F16C 2360/22; F16C 35/073; F16B 41/002
See application file for complete search history.

(56) References Cited

U.S. PATENT DOCUMENTS

| 1,970,078 A | 8/1934 | Dillon |
| 7,041,020 B2 * | 5/2006 | Singer .................. F16C 13/006 |
| | | 474/152 |

(Continued)

FOREIGN PATENT DOCUMENTS

| DE | 10003208 A1 | 8/2001 |
| DE | 102013210935 A1 | 1/2014 |

(Continued)

*Primary Examiner* — Michael R Mansen
*Assistant Examiner* — Robert T Reese
(74) *Attorney, Agent, or Firm* — Bryan Peckjian; SKF USA Inc. Patent Dept.

(57) ABSTRACT

A pulley device for a tensioner roller or winding roller of a torque-transmission transmitter includes a pulley, a bearing, a spacer supporting the bearing and provided with a through bore, and a securing bolt extending into the bore in the spacer. The device further provides at least one means for captively securing the securing bolt relative to the spacer, the captive-securing means being breakable and inserted between the bolt and the spacer.

11 Claims, 2 Drawing Sheets

(56) References Cited

U.S. PATENT DOCUMENTS

| | | | | |
|---|---|---|---|---|
| 8,840,497 B2* | 9/2014 | Wilson | ............... | F16C 13/006 |
| | | | | 474/166 |
| 9,028,352 B2* | 5/2015 | Wilson | ............... | F16C 13/006 |
| | | | | 29/525.01 |
| 9,810,308 B2* | 11/2017 | Quincay | ............... | F16H 55/36 |
| 2005/0026729 A1* | 2/2005 | Schenk | ............... | F16C 13/006 |
| | | | | 474/101 |
| 2011/0152025 A1* | 6/2011 | Wilson | ............... | F16C 13/006 |
| | | | | 474/166 |
| 2014/0004985 A1* | 1/2014 | Lescorail | ............... | F16H 7/12 |
| | | | | 474/166 |
| 2016/0356375 A1* | 12/2016 | Chollet | ............... | F16C 35/073 |

FOREIGN PATENT DOCUMENTS

| | | | |
|---|---|---|---|
| EP | 2339211 A1 | 6/2011 | |
| FR | 2954437 A1 | 6/2011 | |

* cited by examiner

PULLEY DEVICE FOR TENSIONER ROLLER OR WINDING ROLLER

CROSS REFERENCE TO RELATED APPLICATIONS

This application claims priority to French patent application no. 1557574 filed on Aug. 6, 2015, the contents of which are fully incorporated herein by reference.

FIELD OF THE INVENTION

The present invention relates to the field of pulley devices for tension rollers or winding rollers intended to collaborate with a torque-transmission means such as a chain or a belt, for example a motor vehicle internal combustion engine timing belt.

BACKGROUND OF THE INVENTION

Such rollers are used in general to maintain a constant tension on the belt or chain within a determined range or to locally modify the routing of the belt or chain. The terms tensioner rollers and winding rollers, respectively, are thus used. In winding rollers, the pulley is mounted rotationally on a bolt or axle through the intermediary of a bearing, the roller then being attached directly or indirectly to the engine block or to a component of a tensioner roller device, for example an articulated or eccentric member. The bearing is any mechanical device enabling the creation of a pivot connection between the pulley and the bolt or axle, and to this end may be a rolling bearing or a plain bearing.

In general, a spacer is used in conjunction with the bolt or axle to attach the roller to its support. During this installation, it is desirable for the axle or bolt to be axially attached to the other components constituting the roller and comprising the pulley. This provides an assembly which cannot be dismantled, is easy to handle and transport and which may be installed easily.

To this end, a pulley device for a tensioner roller comprising a pulley, a bearing, a spacer supporting the bearing and a securing bolt that is axially immobilized in relation to the spacer is known from document FR 2 954 437. The relative axial retention of the securing bolt and of the spacer is achieved by means of a retaining ring designed to engage with a groove made in the securing bolt.

One of the disadvantages of this solution is that it requires a specific design for the securing bolt. Furthermore, a relatively large clearance must be left free on the frontal surface of the spacer to allow the installation of the retaining ring. This considerably reduces the area for contact between the spacer and its support.

BRIEF SUMMARY OF THE INVENTION

The aim of the present invention is to eliminate the disadvantages.

More particularly, the aim of the present invention is to provide a pulley device that is simple to manufacture and to assemble and which is economical.

To this end, there is proposed a pulley device for a tensioning roller or winding roller of a torque transmission means comprising a pulley, a bearing, a support element supporting the pulley in a rotary manner and provided with a through-bore, a securing bolt extending into the bore of the support element. The device further provides at least one means of keeping the securing bolt captive relative to the support element. In addition, the support element provides a recess extending from the through-bore of the support element, the captive-securing means being able to be mounted at least partially inside the recess.

According to the invention, an exterior radial wall of the recess provides at least one portion which is inclined with respect to the axial direction of the pulley. Because of the interaction between the inclined wall and the captive-securing means, a clamping effect can be achieved very easily and robustly during transport, without the risk of disturbing influences when the device is ultimately mounted on the engine block or elsewhere. The inclined wall may take the form of a chamfer.

In one embodiment, the recess opens onto a radial surface at an axial end of the support element that is the opposite end to a head of the securing bolt.

For preference, the inclination of the wall is such that the recess widens in the direction of the radial surface.

In one embodiment, the captive-securing means is able to be wedged between the exterior radial wall and an external radial surface of the securing bolt, and an angle of inclination of the exterior radial wall is small enough to give rise to a self-locking effect that opposes disengagement of the securing bolt.

In one preferred embodiment, the securing bolt provides at least one threaded portion and the captive-securing means locally covers the threaded part of the securing bolt. It is well known that the self-locking effect is dependent on the relationship between the arctangent of the angle of inclination and the coefficient of friction of grip between the captive-securing means and the surfaces between which it is wedged. Obviously, the coefficient of friction of grip is very high on the threaded part of the securing bolt. Furthermore, for the same reasons, there is no need to machine the exterior walls of the recess to make them smooth.

In addition, the invention proposes for the cavity to have an essentially conical shape. A conical or frustoconical cavity can be created easily and economically—even in one and the same step with the bore.

In one preferred embodiment, the recess has an essentially frustoconical shape.

In one embodiment, the support element is a spacer supporting an interior ring of the bearing.

In another embodiment, the support element is made as one piece with an interior ring of the bearing. For preference, the support element provides raceways, particularly deep grooves for balls, on its circumferential exterior surface.

In one embodiment, the securing means is an O ring. O rings are economical and lend themselves to the creation of a self-locking effect thanks to their high coefficient of friction, particularly in the case of an O ring made of rubber.

In one embodiment, the securing bolt provides a head and a shank comprising at least one threaded portion, the captive-securing means being arranged axially at the opposite end of the support element to the head of the screw. In one embodiment, the captive-securing means is arranged radially between the bore of the support element and the threaded portion of the bolt.

In addition, the captive-securing means may be breakable and temporary. The term "breakable" means a captive-securing means the breakage of which may be brought about by a mechanical action on the part of the user, for example when installed in the device. For example, the mechanical action may be manual, such as applying a tightening torque manually to the securing bolt. Such a pulley device makes it possible to lock the securing bolt temporarily in relation to the spacer, for example during transportation, until the final installation of the device on an exterior support. Furthermore, it is possible to use standard design securing bolts not equipped with a groove.

In a preferred embodiment, the captive-securing means is inserted radially between the bolt and the bore in the spacer.

In one embodiment, the captive-securing means locally covers both the securing bolt and the spacer.

In one embodiment, the captive-securing means is mounted entirely inside the recess.

The device may provide one or more temporary-locking means. The locking means may be produced in the form of rubber balls or of securing points made of a synthetic material.

In another embodiment, the recess is discrete, i.e. it extends within a given angular sector, for example of between 20° and 60° and preferably of between 35° and 45°. Advantageously, the through bore of the spacer provides a plurality of such recesses.

Preferably, the pulley provides an external axial portion and an internal axial portion, attached to an exterior ring of the bearing. Alternatively, the pulley may be made as one piece with the exterior ring.

Another aspect of the invention proposes a method for assembling a pulley device for a tensioning roller or winding roller of a belt or chain, in which a subassembly comprising a pulley, a bearing, a support element supporting the pulley and provided with a through-bore is assembled, a securing bolt is inserted into the bore of the support element, and the securing bolt is held in position relative to the spacer by the fitting of at least one means for the captive securing of the bolt inside a recess extending from the bore. An exterior radial wall of the cavity provides at least one portion that is inclined with respect to the axial direction of the pulley.

BRIEF DESCRIPTION OF THE SEVERAL VIEWS OF THE DRAWING

Other aims, features and advantages of the invention will become apparent from reading the following description, provided solely as a non-exhaustive example, with reference to the appended drawings in which.

DETAILED DESCRIPTION OF THE INVENTION

Figure 1:
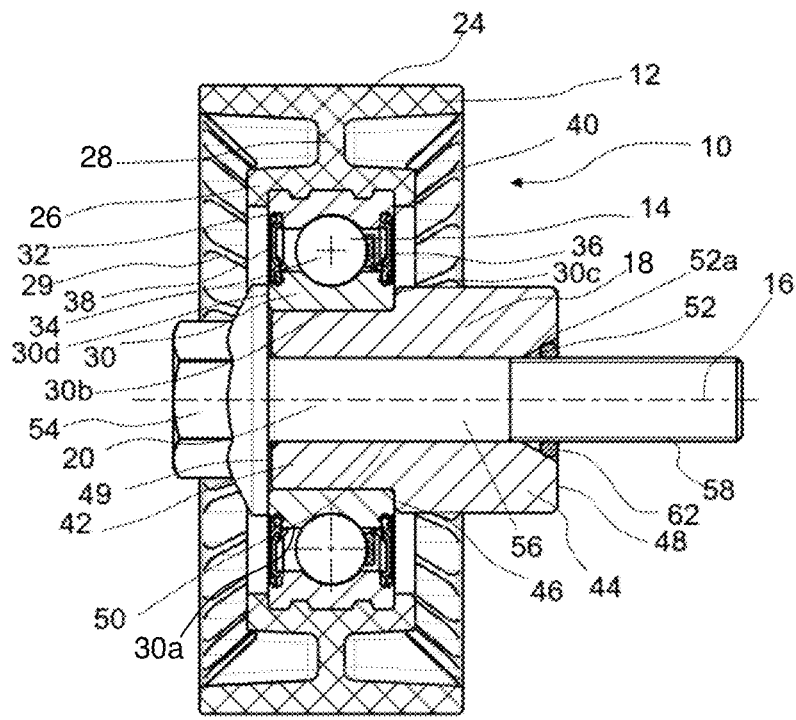
FIG. 1 is a view in axial section of a pulley device according to a first exemplary embodiment of the invention.
Figure 2:
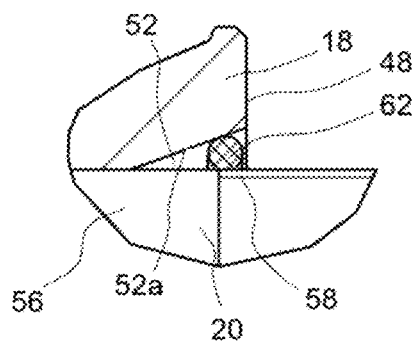
FIG. 2 is a detail view of FIG. 1.

As can be seen in FIGS. 1 and 2, the pulley device for a tensioning roller or winding roller of a torque-transmission transmitter such as a belt or a chain, referenced 10 in its entirety, provides a pulley 12, a rolling bearing 14, a geometric axis 16, a spacer 18 of cylindrical overall shape and a securing bolt 20 coaxial with the axis 16. As will be described in greater detail below, the device 10 provides means provided for ensuring the securing or locking of the securing bolt 20 in relation to the spacer 18.

The pulley 12 provides an exterior axial portion 24 offering an exterior surface intended to collaborate with a torque-transmission means (not depicted) such as a belt or chain, an interior axial portion 26 and a radial annular intermediate portion 28 connecting the portions. The exterior portion 24 and the interior portion 26 are coaxial with the axis 16. Stiffening ribs 29 are also provided between the interior axial portion 26 and exterior axial portion 24 and connect to the intermediate portion 28.

The rolling bearing 14 provides an interior ring 30, an exterior ring 32, a row of rolling elements 34, embodied here in the form of balls, arranged between the raceways of the rings, and a cage 36 ensuring the maintaining of the circumferential spacing of the rolling elements 34. The rolling bearing 14 also provides on each side an annular seal 38, 40 attached to the exterior ring 30 to close off the radial space between the rings, and in which the rolling elements 34 and the cage 36 are housed.

In the exemplary embodiment illustrated, the interior ring 30 and exterior ring 32 are solid. A "solid race" is understood to be a race of which the shape is obtained by machining with removal of chips (by turning or grinding) from tubes, bar stock, forged and/or rolled blanks. The interior ring 30 provides a rotational axial exterior surface 30a on which the toroidal raceway for the rolling elements 34 is formed. The interior ring 30 also provides a bore 30b engaged on the spacer 18 and two radial frontal surfaces 30c, 30d axially delimiting the bore and the exterior surface. The exterior ring 32 has a similar design.

In the exemplary embodiment depicted, the pulley 12 is obtained by over-molding the exterior ring 32 with a plastic material such as a polyamide. This results in excellent cohesion between these components. Alternatively, the pulley may be made from sheet metal and pushed onto the exterior ring 32. In another variant, the pulley 12 and the exterior ring 32 may be made as a single piece.

The spacer 18 of axis 16 provides an axial cylindrical portion 42 onto which the interior ring 30 of the rolling bearing 14 is fitted and which is extended, at one axial end, by an axial cylindrical portion 44 of larger diameter. A radial annular shoulder 46 is formed between the axial portions 42, 44 and forms a thrust surface against which the radial surface 30c of the interior ring 30 bears axially. Axially on the opposite side to the radial shoulder 46, the axial portion 44 is delimited by a radial frontal surface 48 suitable for bearing against a support (not shown) external to the device to enable the device to be mounted and secured on the support. The support may, for example, be an engine block, an articulated or eccentric member of the associated automatic tensioner roller. The axial portion 44 protrudes axially in relation to the pulley 12. Axially on the opposite side to the radial frontal surface 48, the axial portion 42 is delimited by a radial frontal surface 49. The spacer 18 is delimited axially by the radial frontal surfaces 48 and 49.

In this embodiment, the axial dimension of the axial portion 42 is very slightly less than that of the interior ring 30. Thus, the radial surface 49 is slightly offset axially in relation to the radial surface 30d of the interior ring 30. The spacer 18 therefore leaves the radial surface 30d completely free such that it may be used as a reference surface and bear against any other surface.

The spacer 18 provides a cylindrical bore 50, of axis 16, into which the securing bolt 20 extends. The securing bolt 20 may be fitted with a greater or lesser radial clearance inside the bore 50. The bore 50 is a through bore. The bore 50 extends axially from the radial surface 49 to the radial surface 48.

A recess 52 extends from the bore 50. The recess 52 here extends radially outwards from the bore. The recess 52 in this example is produced in the form of a conical bore, namely a conical drilling. The exterior annular wall 52a of the recess 52 is therefore inclined and forms a chamfer. In the embodiment of FIG. 1, the chamfer extends as far as the bore 50. In another embodiment, a flat-bottomed part situated in the radial plane with respect to the axis 16 may be provided radially between the inclined wall 52a and the bore 50 accommodating the screw. As can be seen in FIG. 2, the axial section of the recess 52 has a conical shape.

As illustrated more visibly in FIG. 2, the inclined wall 52a in the form of a chamfer is made on the bore 50 of the spacer 18, opening onto the radial surface 48. The recess 52 is of frustoconical shape, of axis 16, with a smaller diameter equal to that of the bore 50. The cone angle α or angle of inclination of the wall that is inclined with respect to the axis 16 may advantageously be between 10° and 40°, and preferably between 25° and 35°, in particular being equal to 30°. In particular, this angle of inclination of the exterior radial wall 52a is small enough to bring about a self-locking effect that opposes the disengagement of the securing bolt 20.

With reference once more to FIG. 1, the securing bolt 20 provides a tightening head 54 and a shank equipped with a smooth portion 56 extending axially from the head and being centered inside the bore 50, and a threaded portion 58 opposite to the head. The threaded portion 58 of the bolt protrudes axially in relation to the radial surface 48 of the spacer 18. It is intended to be inserted into a threaded hole provided in the support external to the device.

As shown above, the device 10 provides means for ensuring the holding captive of the securing bolt 20. In the exemplary embodiment illustrated, these means are produced in the form of an O ring 62 interposed radially between the bolt 20 and the spacer 18 inside the chamfer of the recess 52 of the spacer 18.

The O ring 62 is wedged between the inclined surface 52a of the recess 52 and the securing bolt 20 so that a self-locking effect occurs when the securing bolt 20 is pulled in the direction of its head 54. The pulling force in this direction results in a radial clamping force between the O ring and its contact surfaces. This force brings about an increase in the friction of grip that is greater than the pulling force itself. As a result, the bolt 20 cannot be detached. During the final mounting of the device on a radial support, the bolt 20 has a tendency to move in the axial direction in which the wedging force is reduced. Thus, the friction of grip becomes too low to interfere with the control over the torque used to tighten the bolt 20 at the time of the final mounting of the device on its support.

The following procedure is used to assemble the pulley device 10.

Firstly, a sub-assembly comprising the pulley 12, the rolling bearing 14 and the spacer 18 is produced. To this end, the pulley 12 is assembled with the exterior ring 26 of the rolling bearing 14. Next, the spacer 18 is installed in the bore 30b of the interior ring 30 of the rolling bearing 14 until the shoulder 46 comes into abutment against the radial frontal surface 30c. Secondly, the securing bolt 20 is inserted into the washer 60 then into the spacer 18 of the sub-assembly.

Thirdly, the O ring 62 is mounted in the annual cavity 52 in such a way that an axial clearance around the bolt 20 is essentially reduced to nothing. The O ring 62 acts as a means for keeping the securing bolt 20 captive with respect to the spacer 18. This captive-securing means 62 performs the dual function of providing axial retention and circumferential retention of the bolt 20.

By providing a means 62 for keeping the securing bolt 20 captive in relation to the spacer 18, the securing bolt 20 can be tightened more securely in its support. Indeed, during the tightening of the securing bolt 20, when the radial frontal surface 48 comes into abutment against the exterior support, the captive-securing means 62 ceases to have its effect. Because the securing bolt 20 is capable of pivoting in relation to the spacer 18, it is possible to tighten this bolt more securely.

Furthermore, in the exemplary embodiment shown, the captive-securing means 62 is recessed from or fits flush with the surface 48 for mounting the spacer 18 on its support. The absence of members protruding in relation to the surface 48, with the exception of the securing bolt 20, makes it possible to position the pulley device 10 more easily against its support. However, in an embodiment variant, it could be possible to provide captive-securing means 62 between the securing bolt 20 and the frontal surface 48 of the spacer.

Furthermore, the pulley device 10 offers the advantage of not requiring a specific design of the securing bolt 20.

Figure 3:
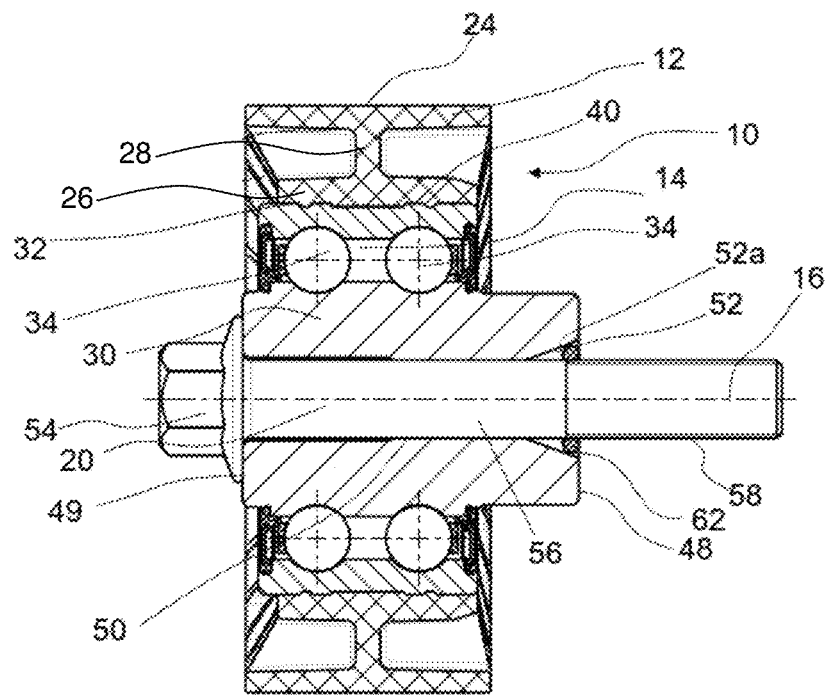
FIG. 3 is a view in axial section of a pulley device according to a second exemplary embodiment of the invention.

The second exemplary embodiment illustrated in FIG. 3, in which the elements that are identical bear the same references, differs from the first example described in that the spacer and the interior ring of the bearing are replaced by a single element 30 comprising raceways. This element 30 is an interior ring projecting axially with respect to the exterior ring. Furthermore, the bearing 14 is a double-row ball bearing.

The recess 52 accommodating the captive-securing means 62 and the bore 18 is produced directly in this modified interior ring 30.

Figure 4:
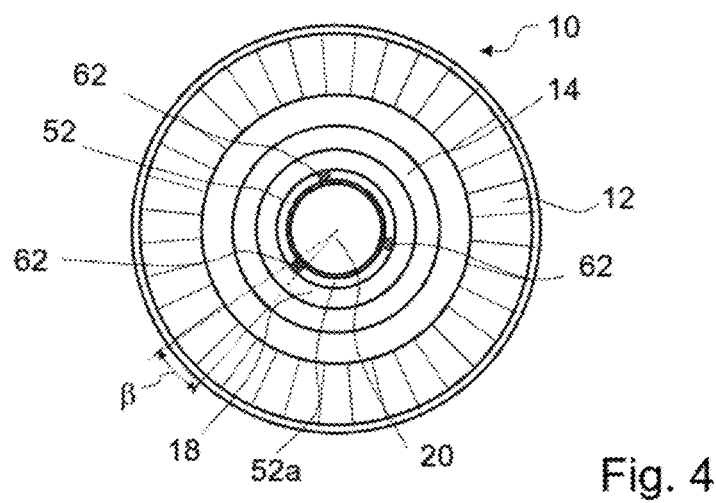
FIG. 4 is a side view of a pulley device according to a third exemplary embodiment of the invention.

In a third embodiment illustrated in FIG. 4, in which the elements that are identical bear the same references, the device provides several captive-securing means having a dual function as temporary-locking means in the form of several securing points 62, made of synthetic material. The securing points 62 are made from synthetic material, polyamide material for example, deposited by over-molding for example. Alternatively, the synthetic material may be adhesive or silicone.

By adjusting the quantity of synthetic material applied, it is possible to define a shearing threshold for the temporary locking of the bolt 20 in relation to the spacer 18. In other terms, in this embodiment the number of securing points 62 and the quantity of synthetic material applied per securing point 62 may advantageously be calculated such that the action of tightening the bolt 20 manually by the user results in the shearing of the locking of the bolt 20 in relation to the spacer 18. By contrast, a pulling force in the axial direction of the head of the bolt 20 brings about a self-locking effect and compresses the synthetic material so that shearing is avoided. As a result, this locking is temporary and is only effective during storage and transportation of the pulley device 10.

As can be seen in FIG. 4, each securing point 62 extends along the chamfer of the frustoconical recess 52, within an angular sector β about the axis 16. In this embodiment, the angle β is between 1° and 10°, preferably between 1° and 5°, and in particular substantially equal to 3°. This localized application of the captive-securing means 62 reinforces the temporary nature thereof. Alternatively, each temporary captive-securing means 62 may be embodied in the form of at least one continuous line of adhesive inside the recess 52, extending over a wider angular sector.

In this embodiment, the device provides three securing points 62. However, it is not considered to be straying from the scope of the invention by applying a different number of securing points 62, for example, 1, 2, 4 or more.

These locking means 62 are separable to permit a temporary locking of the bolt 20, for example, limited to storage and transportation of the pulley device 10.

In another embodiment, the securing means of the third embodiment are replaced by rubber balls pressed into the recess.

In other embodiments which have not been illustrated, the device provides at least one recess extending in an angular sector strictly smaller than 360°, and in this particular example, of between 35° and 45°. Each recess extends from the bore and provides an inclined wall as described hereinabove. Advantageously, there are as many recesses as there are securing points. Each securing point is arranged inside its own recess. For preference, the identical recesses are provided on the support element and are spaced apart from one another in the circumferential direction, in this instance evenly spaced. Such an exemplary embodiment is particularly advantageous in that the area for contact between the support element and its support is greater.

The invention has been illustrated on the basis of a pulley device comprising a rolling bearing provided with an interior ring, an exterior ring and at least one row of rolling elements arranged between the rings. Alternatively, the bearing may be of the sliding bearing type and provide an annular body, formed from thermoplastic material for example, and may provide radial grooves able to be filled with lubricant. In another variant, the sliding bearing may provide two raceways or rings sliding directly against each other.

Finally, this solution provides a more economical and easier to implement means that allows, in addition, improved securing of the pulley device on its exterior support.

The invention claimed is:

1. A pulley device for a tensioning roller of a torque transmission transmitter comprising:
   a pulley;
   a bearing;
   a support element supporting the pulley in a rotary manner and provided with a through-bore;
   a securing bolt extending into the through-bore of the support element; and
   at least one captive-securing element configured to keep the securing bolt captive relative to the support element, the support element having a recess extending from the through-bore to the support element, the captive-securing element having an exterior diameter and an interior diameter, the captive-securing element being mounted at least partially inside the recess,
   wherein an exterior radial wall of the recess provides at least one portion that is inclined with respect to the axial direction of the pulley, the at least one portion that is inclined being formed as a substantially conically shaped bore, the conically shaped bore having a linear sidewall in an axial direction, extending at an acute angle from an interior surface of the through-bore to the exterior radial wall,
   wherein the exterior diameter of the captive-securing element is sized to and engages with a surface of the inclined portion of the exterior radial wall creating a wedge between the inclined portion of the exterior radial wall and engagement between the interior diameter of the captive-securing element and an exterior diameter of the securing bolt, the captive securing element being wedged at a position along and axial position of the conically shaped bore between a first edge of the conically shaped bore and a second edge of the conically shaped bore.

2. The device according to claim 1, wherein the recess opens onto a radial surface at an axial end of the support element that is at the opposite end to a head of the securing bolt.

3. The device according to claim 2, wherein the recess widens in the direction of the radial surface.

4. The device according to claim 1, wherein an angle of inclination of the exterior radial wall is small enough to give rise to a self-locking effect that opposes disengagement of the securing bolt.

5. The device according to claim 1, wherein the securing bolt further comprises at least one threaded portion, and wherein the captive-securing element locally covers and engages with the threaded portion of the securing bolt.

6. The device according to claim 1, wherein the recess has a frustoconical shape.

7. The device according to claim 1, wherein the support element is a spacer supporting an interior ring of the bearing.

8. The device according to claim 1, wherein the support element is made as one piece with an interior ring of the bearing.

9. The device according to claim 1, wherein the captive-securing element is an O-ring.

10. A method for assembling a pulley device for a tensioning roller or winding roller of a torque-transmission transmitter, the method comprising:
    providing a subassembly including:
    a pulley;
    a bearing;
    a support element supporting the pulley being provided with a through-bore;
    a securing bolt; and
    at least one captive-securing element having an exterior diameter and an interior diameter,
    wherein an exterior radial wall of the cavity provides at least one portion that is inclined with respect to the axial direction, the at least one portion that is inclined being formed as a substantially conically shaped bore, the conically shaped bore having a linear sidewall in an axial direction, extending at an acute angle from an interior surface of the through-bore to the exterior radial wall,
    wherein the securing bolt is inserted into the bore of the support element, and the securing bolt is held in position relative to the spacer by the fitting of the at least one captive-securing element for the captive securing of the bolt inside a recess extending from the bore, wherein the exterior diameter of the captive-securing element is sized to and engages with a surface of the inclined portion of the exterior radial wall creating a wedge between the inclined portion of the exterior radial wall and engagement between the interior diameter of the captive-securing element and an exterior diameter of the securing bolt, the captive securing element being wedged at a position along and axial position of the conically shaped bore between a first edge of the conically shaped bore and a second edge of the conically shaped bore.

11. A pulley device for a winding roller of a torque transmission transmitter comprising:
    a pulley;
    a bearing;
    a support element supporting the pulley in a rotary manner and provided with a through-bore;
    a securing bolt extending into the through-bore of the support element; and at least one captive-securing element configured to keep the securing bolt captive relative to the support element, the support element having a recess extending from the through-bore to the support element, the captive-securing element having an exterior diameter and an interior diameter, the captive-securing element being mounted at least partially inside the recess, wherein an exterior radial wall of the recess provides at least one portion that is inclined with respect to the axial direction of the pulley, the at least one portion that is inclined being formed as a substantially conically shaped bore, the conically shaped bore having a linear sidewall in an axial direction, extending at an acute angle from an interior surface of the through-bore to the exterior radial wall, wherein the exterior diameter of the captive-securing element is sized to and engages with a surface of the inclined portion of the exterior radial wall creating a wedge between the inclined portion of the exterior radial wall and engagement between the interior diameter of the captive-securing element and an exterior diameter of the securing bolt, the captive securing element being wedged at a position along and axial position of the conically shaped bore between a first edge of the conically shaped bore and a second edge of the conically shaped bore.

* * * * *